United States Patent [19]

Cantrill et al.

[11] Patent Number: 5,550,186
[45] Date of Patent: * Aug. 27, 1996

[54] PARTICLE SIZING

[75] Inventors: James E. Cantrill, Acton; Thomas R. Doyle, Leominster; both of Mass.

[73] Assignee: Novacor Chemicals (International) S.A., Fribourg, Switzerland

[*] Notice: The portion of the term of this patent subsequent to Apr. 17, 2015, has been disclaimed.

[21] Appl. No.: 424,597

[22] Filed: Apr. 17, 1995

Related U.S. Application Data

[63] Continuation of Ser. No. 94,381, Jul. 19, 1993, abandoned.

[51] Int. Cl.$^6$ .................... C08F 279/02; C08F 287/00
[52] U.S. Cl. .................. 525/52; 525/53; 525/198; 525/316; 528/502 F
[58] Field of Search ............... 525/52, 53, 198, 525/316; 528/502

[56] References Cited

U.S. PATENT DOCUMENTS

| | | | |
|---|---|---|---|
| 2,694,692 | 11/1954 | Amos et al. | 260/45.5 |
| 3,658,946 | 4/1972 | Bronstert et al. | 260/878 R |
| 3,660,535 | 5/1972 | Finch et al. | 260/880 |
| 3,883,616 | 5/1975 | Hozumia et al. . | |
| 3,903,202 | 9/1975 | Carter et al. | 260/880 R |
| 4,007,234 | 2/1977 | Schuddemage et al. | 260/878 R |
| 4,233,418 | 11/1980 | Lingier et al. . | |
| 4,308,354 | 12/1981 | Jung et al. . | |
| 4,857,587 | 8/1989 | Sosa et al. | 525/53 |
| 4,861,827 | 8/1989 | Sosa et al. | 525/54 |
| 4,985,208 | 1/1991 | Sugawara et al. . | |
| 5,210,132 | 5/1993 | Matsubara et al. | 525/53 |
| 5,274,029 | 12/1993 | Kelley . | |
| 5,278,253 | 1/1994 | Baumgartner et al. . | |
| 5,340,891 | 8/1994 | Imamura et al. | 526/88 |

FOREIGN PATENT DOCUMENTS 832523  1/1970  Canada .

OTHER PUBLICATIONS

Kirk–Othmer, *Encyclopedia of Chemical Technology*, 1983, vol. 21, pp. 823–826.

*Primary Examiner*—Vasu S. Jagannathan
*Attorney, Agent, or Firm*—Kenneth H. Johnson

[57] ABSTRACT

The volume average diameter of relatively large rubber-like composite particles dispersed through out a continuous resin phase may be reduced by subjecting the syrup to a shear field. The application of a uniform shear field generator to the relatively large rubber-like composite particle syrup is particularly desirable since it gives a high degree of control over the size and distribution of the dispersed rubber-like composite phase. As a result it is possible to optimize the particle size distribution in an impact modified thermoplastic and obtain better or a better balance of properties.

41 Claims, 4 Drawing Sheets

PARTICLE SIZING

This is a continuation of application Ser. No. 08/094,381 filed on Jul. 19, 1993 abandoned.

FIELD OF THE INVENTION

The present invention relates to a process to improve the properties or balance of properties of impact modified thermoplastics. More particularly, the present invention relates to a process that produces in the early part of the process a relatively large particle size rubber-like composite phase dispersed in a syrup comprising a continuous resin phase and then later in the process alters the particle size of all or part of the rubber-like composite phase dispersed in a syrup comprising a continuous resin phase.

BACKGROUND OF THE INVENTION

The field of the manufacture of impact modified plastics is relatively old and the current industrial processes for their manufacture are fairly well known. According to conventional technology typically a solution of rubber, typically comprising 1 to about 20, preferably from 3 to 12 weight %, most preferably 4 to 10 weight % of rubber dissolved in one or more monomers is polymerized in a first stage reactor under mechanical agitation. Whether the polymerization occurs in a batch, stirred plug flow or continuous stirred tank reactors, almost all prior art and disclosures clearly teach that the particle size, particle size distribution and morphology of the dispersed rubber-like composite phase of the final product is largely determined during particulation in the early part of the process.

Particulation is the generic term used to describe the formation of the dispersed rubber-like composite phase regardless of its mechanism.

In the production of high impact polystyrene in a batch process or in a stirred plug flow reactor, the rubber-like composite phase is the continuous phase and the resin phase (monomer/resulting polymer phase) is dispersed. Typically, in conventional processes, as the polymerization proceeds in time with a batch reactor or in space with a stirred plug flow reactor at some point between 5 and 20% conversion the system undergoes particulation by phase inversion under the application of a shear field generated by mechanical agitation. That is the rubber-like composite phase becomes the dispersed phase and the resin phase becomes the continuous phase. This does not happen instantaneously but occurs over a considerable period of time or space, typically from 20 to 50 minutes or reactor space which produces 2 to 8% conversion. That is the rubber-like composite phase and resin phase become co-continuous for a period of time or space before the particulation process is complete.

The ternary phase diagram of the styrene-polystyrene-polybutadiene system has been well studied and is well known. For example, the phase diagram and what happens during the polymerization of high impact polystyrene is discussed in Kirk-Othmer Encyclopedia of Chemical Technology published in 1983, Volume 21, pages 823 through 826.

In the production of high impact polystyrene in a continuous stirred tank reactor (CSTR) the rubber phase is particulated by the mechanism of dispersion. That is the rubber or rubber-like composite phase is dispersed in a CSTR that is operated with a continuous resin phase.

The distinction between rubber phase and rubber-like composite phase used in this document is as follows: The rubber phase is simply rubber dissolved in one or more monomers, while the rubber-like composite phase refers to rubber that has been modified by reaction with one or more monomers during polymerization. That is during polymerization polymer chains containing one or more monomers is grafted to the rubber molecules. In addition to graft copolymer, the rubber-like composite phase may contain occluded polymer. Occluded polymer is not grafted to the rubber molecules and resides within the rubber-like composite phase.

According to conventional wisdom the polymer chemist has a limited degree of freedom concerning the process of particulation in the manufacture of impact modified thermoplastic resins. That is particulation is limited to the region of phase inversion in a batch process and stirred plug flow reactors or at the point of dispersion in CSTR's. It is impossible to precisely control particulation in batch or plug flow reactors since it occurs over a period of time or a region of reactor space. In a CSTR particulation by dispersion occurs almost instantaneously, but due to the dynamics of the system the time the particles spend in the reactor is described by an exponential distribution. That is some particles exit the reactor shortly after forming while others may reside much longer. Furthermore, in a CSTR it is difficult, if not impossible to ensure that each unit volume of the reactants under goes the same or comparable shear history. As a result the particle size distribution of the dispersed rubber-like composite phase is typically broadest when formed in a CSTR.

Particle size, particle size distribution and morphology contribute to a number of properties of the product including impact resistance, gloss and translucency. Unfortunately, generally to maximize one property tends to reduce one or more of the other properties of the final polymer. There have been some attempts to overcome these deficiencies by blending resins having different particle sizes. Such an approach is expensive as it requires passing a melt blend of the resins through an extruder. Additionally, the properties of a blend may be lower than that expected from the weighted numerical average of the properties of each of the components in the blend.

The following is representative of the state of the art in the polymerization of impact modified thermoplastics. Almost all techniques largely determine the final particle size of the rubber-like composite phase at the point of phase inversion or dispersion.

U.S. Pat. No. 2,694,692 issued Nov. 16, 1954, assigned to The Dow Chemical Company discloses the desirability and criticality of agitation during the early stages of polymerization of impact modified thermoplastic polymers.

U.S. Pat. No. 3,658,946 issued Apr. 25, 1972, assigned to Badische Aniline-& Soda-Fabrik Aktiengesellschaft (BASF) discloses particle size and distribution of impact modified thermoplastics may be controlled by varying the stirrer speed or shear during the early part of the reaction.

U.S. Pat. No. 3,660,535 issued May 2, 1972 assigned to the Dow Chemical Company discloses stirring or mechanical agitation during the initial stages of polymerization to create the required particle size distribution in the polymerization of an impact modified thermoplastic.

U.S. Pat. No. 3,903,202 issued Sep. 2, 1975 assigned to Monsanto Company teaches dispersing under mechanical agitation a monomer syrup containing rubber into a partially polymerized monomer, during the early stages of polymerization to create the required dispersion of impact modifier throughout the resin phase.

U.S. Pat. Nos. 4,857,587 and 4,861,827 issued Aug. 15 and 29, 1989 respectively, assigned to Fina Technology Inc. discloses the use of mechanical agitation during the early stages of the polymerization of an impact modified thermoplastic to create the required dispersion of rubber throughout the continuous resin phase.

There are three patents which Applicants are aware of which state the control of shear is important in the process.

Canadian Patent 832,523 issued Jan. 20, 1970 to Shell Internationale Research Maatschappij N.V., teaches HIPS containing a bimodal particle size distribution. The HIPS comprises from 70 to 99 weight % of polystyrene and from 1 to 30 weight % of a dispersed rubber phase having a particle size distribution so that from 70 to 97% of the particles have a diameter from 1 to 3 microns and from 30 to 3% of the particles have a diameter from 5 to 25 microns.

The Shell patent teaches controlling agitation or shear during the early stages of polymerization to obtain the required particle distribution. The Shell patent teaches using the shear of a conventional process.

It is interesting to note that while the Shell patent also clearly contemplates blending impact modified polystyrenes (page 4, lines 10–15) and interpolymerizing styrene monomer containing two distinct types of rubber to obtain the required particle size distribution, it does not teach or disclose blending syrups having different particle size distributions and completing the polymerization to directly yield a product having a bi-modal particle size distribution.

U.S. Pat. No. 4,007,234, assigned to Hoechst A. G., issued Feb. 8, 1977 discloses a process for controlling the particle size distribution in high impact styrene copolymers modified with ethylene-propylene rubbers. The polymer is prepared using a mass/mass or mass/suspension process with high shear in the prepolymerizer. The resulting polymer is then subjected to a two stage shearing action. A catalyst is introduced into the polymer prior to or during the second shearing to crosslink the rubber particles and to maintain particle size. While the Hoechst patent teaches shearing the polymer, it does not disclose shearing the syrup as required in the present invention. Additionally, the rubber used in the Hoechst process is EPDM which is not used in the present invention.

U.S. Pat. No. 5,210,132 assigned to the Mitsui Toatsu Chemicals, Inc. issued May 11, 1993 discloses a process which forms a dispersed rubber-like composite phase in a continuous resin phase. The particulated syrup is then subjected to shear in a device having at least three shearing blades or rotors. The shearing rotors and stators are coaxial and have comb like cuts at interposing ends or sections to form a multilayer structure. The result is that the Mitsui patent teaches a multi-zone shear field having at least three different shear rates. The shear field in the device of the Mitsui patent will vary radially outward from the centre of the cylindrical comb like rotor as a function of the distance from the centre of the rotor. The present invention is a process in which at least a portion of the syrup is subjected to a relatively uniform controlled shear field. Accordingly the essential features of the Mitsui patent teaches away from the broadest aspects of the present invention requiring the use of a relatively uniform shear field.

In addition to teaching away from the broadest aspects of the present invention the Mitsui patent totally fails to disclose several other aspects of the present invention. Particularly, the use of relatively uniform shear fields to treat portions of the initial syrup and then recombining the treated syrup to form a bi- or polymodal particle size distribution is not disclosed by the Mitsui patent.

None of the above art suggests a process in which large particle size rubber-like composite phase is produced during the initial stages of polymerization which particles are subsequently reduced in size using a controlled relatively uniform shear field. The shear field of the present invention is relatively uniform in that it is relatively free of shear pulsations (compared to more typical agitators in chemical processes such as turbines, anchors, propellers, screws, or helices). An example of a relatively uniform shear field is that generated between coaxial cylinders in which one or both of the cylinders rotate.

There are a number of advantages of the process of the present invention. The invention permits a high degree of control over the particle size, narrowing of the particle size distribution and the process is easily modified by stream splitting and the application of multiple uniform shear field generating devices to produce bi- or multimodal particle size distributions all of which will lead to a better or better balance of properties. In addition by largely setting the particle size of the dispersed rubber-like composite phase in the later part of the process the transition time between grade changes is reduced, which minimizes the amount of off-grade material that is formed in continuous processes.

Accordingly, the present invention seeks to provide an industrial process to reduce the particle size (e.g. the volume average diameter) of at least a portion of the particles within a syrup comprising a resin phase and a dispersed rubber-like composite phase.

As used in this specification the following terms have the following meanings:

"Resin phase" means a solution of polymer resin dissolved in one or more monomers or the polymer itself;

"Rubber phase" means an uncrosslinked rubber dissolved in one or more monomers, or the rubber itself;

"Rubber-like composite phase" means a composite of a rubber phase as defined above and one or more resin phases as defined above. Said composite may contain resin polymers occluded by or grafted onto the rubber polymers;

"Dispersion" means a system of two or more phases in which one phase forms a continuous phase and the other phases are dispersed as small droplets or particles through the continuous phase;

"Dispersed rubber-like composite phase" means a rubber-like composite phase dispersed throughout a continuous resin phase;

"Particulation" a term used to describe the formation of a dispersed rubber-like composite phase regardless of its mechanism;

"Inverting" or "inversion" or "phase inversion" or "particulation by inversion" means the conversion of a continuous rubber-like composite phase into a dispersed rubber-like composite phase in a continuous resin phase;

"Dispersing" or "phase dispersion" or "particulation by dispersion" means the formation of a dispersed rubber-like composite phase in a continuous resin phase by dispersing with mechanical agitation a rubber phase or continuous rubber-like composite phase into a tank which has a continuous resin phase. Typically, this process occurs in a continuous stirred tank reactor (CSTR); and "Low mechanical agitation" means an agitation rate which is not sufficient to significantly reduce the particle size within a syrup once particles have been formed. Low mechanical agitation occurs using anchor or turbine or other types of agitators at low rates of rotation. Typically with driven agitators the rates of rotations are less than 15, preferably less than 10 RPM's most preferably as low as possible. Of course one skilled in the art will be aware that the degree of agitation will depend on reactor configuration and appropriate speeds can be determined by routine experimentation after reading this specification.

SUMMARY OF THE INVENTION

According to the broadest aspect of present invention there is provided, a process to decrease the volume average diameter of the particle distribution of a dispersed rubber-like composite phase in a portion of a syrup comprising a dispersed rubber-like composite phase in a continuous resin phase, subjecting said syrup to a relatively uniform controlled shear field to reduce the volume average diameter of said particles within said syrup by not less than 20%, most preferably at least 30%.

The so treated syrup may be subsequently subjected to routine further polymerization and optionally devolatilization.

In a further preferred embodiment, the relatively large particle size syrup may be divided into two or more streams, one or more of the said streams may be treated to a relatively uniform controlled shear field to reduce the volume average diameter of the particle size distribution of the dispersed rubber-like composite phase in a continuous resin phase and combining said streams to give a syrup with a bi- or multimodal particle size distribution.

The so treated syrup may be subsequently subjected to routine further polymerization and optionally devolatilization.

DETAILED DESCRIPTION

The process of the present invention is extremely broad in its application. For example the at least a portion of the syrup could comprise the entire syrup. In this embodiment the alteration or reduction of the volume average diameter of particles occurs by treating all or only a portion of the syrup to reduce its particle size. The syrup could be prepared under low mechanical agitation and the resulting large particle syrup could be reduced in particle size. In a different embodiment of the present invention the syrup could be divided into two or more portions each of which are separately subjected to a different controlled shear to cause a different reduction in the volume average diameter of the particles within that portion of the syrup. Each portion may then be separately substantially polymerized to generate two or more different polymer products. In a particularly preferred embodiment the syrup is divided into two or more portions, each of which is then subjected to a different controlled shear to produce a different volume average particle diameter rubber particle in each portion. At least two of the resulting portions of syrups may then be combined and substantially polymerized to yield a product having at least two particle size distributions of the dispersed rubber-like composite phase.

In a particularly preferred embodiment of the present invention the initial syrup is produced under low shear conditions so that the rubber particles have a large volume diameter.

Typically the large particles have a diameter greater than 6, preferably from 6.5 to 15, more preferably greater than 8 micrometers.

The impact modified polymers which may be prepared in accordance with the present invention include high impact polystyrene (HIPS), acrylonitrile butadiene styrene polymers (ABS) and methyl methacrylate butadiene styrene polymers (MBS). The monomers useful in accordance with the present invention for the formation of the thermoplastic polymer may be selected from the group consisting of $C_{8-12}$ vinyl aromatic monomers which are unsubstituted or substituted by a $C_{1-4}$ alkyl radical, $C_{1-8}$ alkyl esters of acrylic or methacrylic acids, maleic anhydride, acrylonitrile, and methacrylonitrile.

Suitable $C_{8-12}$ vinyl aromatic monomers which are unsubstituted or substituted by a $C_{1-4}$ alkyl radical include styrene, α-methyl styrene, p-methyl styrene, and p-t-butyl styrene. Useful $C_{1-8}$ alkyl esters of acrylic or methacrylic acids include methyl methacrylate, ethyl methacrylate, methyl acrylate, ethyl acrylate, and ethylhexyl acrylate.

The resin component in the impact modified thermoplastic may comprise a co- or homo-polymer of one or more $C_{8-12}$ vinyl aromatic monomers which are unsubstituted or substituted by a $C_{1-4}$ alkyl radical. A suitable resin includes polystyrene. However, the resin may be a copolymer comprising from 5 to 95, preferably from 50 to 90 weight % of one or more $C_{8-12}$ vinyl aromatic monomers and from 95 to 5, preferably from 50 to 10 weight % of one or more monomers selected from the group consisting of $C_{1-8}$ alkyl esters of acrylic or methacrylic acids, maleic anhydride, acrylonitrile, and methacrylonitrile. Typically such polymers are copolymers of styrene and one or more monomers selected from the group consisting of acrylonitrile, methacrylonitrile, methyl acrylate, ethyl acrylate, methyl methacrylate, ethyl methacrylate, butyl acrylate, butyl methacrylate, ethylhexyl acrylate and maleic anhydride. The resin may be a homo- or co- polymer of one or more $C_{1-8}$ alkyl esters of acrylic or methacrylic acids, preferably those listed above.

When finally finished the resin polymers should have a number average molecular weight greater than 65,000 preferably greater than 70,000 for the styrene containing polymers and a number average molecular weight of greater than 30,000 for the predominantly ester polymers.

The rubbers which may be used as impact modifiers in the present invention will typically have a (weight average) molecular weight (Mw) of greater than about 100,000, preferably greater than 200,000. Block rubber copolymers have significantly lower molecular weight, typically greater than 50,000 (Mw). The rubbers may be selected from the group consisting of:

(i) co- or homopolymers of $C_{4-6}$ conjugated diolefins which are unsubstituted or substituted by a halogen atom, preferably a chlorine or bromine atom;

(ii) random, block, linear, star and tapered copolymers comprising from 10 to 80 weight % of one or more $C_{8-12}$ vinyl aromatic monomers which are unsubstituted or substituted by a $C_{1-4}$ alkyl radical, from 20 to 90 weight % of one or more $C_{4-6}$ conjugated diolefins; and (iii) copolymers comprising from 1 to 50 weight % acrylonitrile or methacrylonitrile and, from 50 to 99 weight % of one or more $C_{4-6}$ conjugated diolefins.

Suitable polymers which are co or homopolymers of $C_{4-6}$ conjugated diolefins include homopolymers of butadiene and copolymers of butadiene and styrene (styrene butadiene rubbers or SBR) or copolymers of butadiene and acrylonitrile (nitrile rubbers). Preferably the polymer will be a homopolymer of butadiene. Generally such homopolymers have a level of stereospecificity. The selection of the degree of stereospecificity will depend to some extent upon the properties required in the final product. Some polybutadienes contain over 90, most preferably over 95 weight % of monomer in the cis configuration. Such a type of polymer is commercially available from Polysar Rubber Corporation under the trademark TAKTENE® 1202. The polybutadiene may contain a lower amount, typically from 50 to 65, most preferably about 50 to 60 weight % of monomer in the cis configuration such as polymers which are available from Firestone under the trademark DIENE® 55 or from the Polysar Rubber Corporation under the trademark TAKTENE® 550.

Suitable rubbery polymers may comprise: from 10 to 80, preferably from 20 to 50 weight % of one or more $C_{8-12}$ vinyl aromatic monomers which are unsubstituted or substituted by a $C_{1-4}$ alkyl radical, and from 20 to 90, preferably from 50 to 80, weight % of one or more $C_{4-6}$ conjugated diolefins. Such rubber polymers may be random or block such as linear block, star block or tapered block polymers.

Random copolymers having the above composition are the commercially available styrene butadiene rubbers (SBR). A number of block copolymers are available from Shell under the trademark KRATON®.

The rubbery polymer may comprise from 1 to 50, preferably from 5 to 35 weight % of acrylonitrile or methacrylonitrile and, from 50 to 99, preferably from 95 to 65 weight % of one or more $C_{4-6}$ conjugated diolefins.

The above polymers are the commercially available nitrile rubbers available from Polysar Rubber Corporation under the trademark KRYNAC® and from Bayer AG under the trademark PERBUNAN®.

It should be kept in mind that the rubber should be soluble in one or more of the monomers of the thermoplastic or the diluent or solvent for the monomers. The solubility of the above rubbers in various monomers and/or diluents or solvents may be easily determined by non-inventive routine testing.

Typically, from about 1 to 20, preferably from about 3 to 12, most preferably from 4 to 10 weight % of the rubber is dissolved in the monomer or a mixture of monomers to form a syrup.

In a typical batch or plug flow reactor system the syrup is subjected to the usual polymerization process under agitation. At some point between 5 and 20% conversion the system undergoes particulation by phase inversion under the application of a shear field generated by mechanical agitation. That is the rubber-like composite phase becomes the dispersed phase and the resin phase becomes the continuous phase. This does not happen instantaneously but occurs over a considerable period of time or space, typically from 20 to 50 minutes or reactor space which produces 2 to 8% conversion. As a result there tends to be a particle size distribution within the inverted syrup. In accordance with the present invention it is possible to resize such particles after the syrup has inverted, and to alter the particle size distribution and to lower the volume average diameter of the particles within the syrup.

In a preferred embodiment of the present invention the initial syrup is polymerized in a batch or plug flow process, under low mechanical agitation conditions, either thermally or in the presence of one or more initiators. Typical polymerization temperatures (in the reactors) range from 80 to 180, more typically 90° to 170° C. Under these conditions the syrup inverts and the dispersed phase has a large particle size distribution. The resulting particles tend to have a volume average diameter of greater than 6, preferably greater than 6.5, more preferably greater than 8 micrometers.

The resulting large particle syrup is then treated in accordance with the present invention to reduce the volume average particle diameter. In accordance with this aspect of the invention, the syrup is polymerized to a conversion between 1% above the point at which the syrup has inverted and the point at which the rubber has become crosslinked to form a network. Preferably the degree of conversion is between 5 and 75% before the syrup is treated in accordance with the present invention. In one aspect of the invention the syrup may be at a conversion between 5 and 20% and in another aspect the conversion may be between 20 and 75% before the syrup is treated in accordance with the present invention.

In a particularly preferred embodiment the syrup may be handled using low shear methods such as low shear pumps, gravity feeds or vacuum and pressure techniques.

A reactor or a chain of reactors having low mechanical shear such as a plug flow reactor may be used to produce such a syrup. Upon inversion or dispersion the rubber-like composite phase will be distributed throughout the continuous resin phase as fairly large particles. The plug flow reactors should have a length to diameter ratio of greater than about 3:1, preferably from about 5:1 to 15:1, most preferably about 9:1. The reactors may contain an anchor or wiper type stirrer to provide for movement of the syrup for heat transfer requirements but should not provide any high shear agitation as this will tend to reduce the particle size of the dispersed rubber-like composite phase.

Another way of producing a large particle syrup is to feed a rubber solution or partially polymerized syrup below its inversion point to a continuous stirred tank reactor (CSTR) operated at an equilibrium conversion sufficiently high so that the said rubber solution or partially polymerised syrup is dispersed as discrete particles in a continuous resin phase. The resulting syrup may then be treated in accordance with the present invention.

The breadth of the particle size distribution can be indicated by comparing the diameter at which the cumulative fraction of particle is 0.25 with the diameter at which the cumulative fraction of particles is 0.75. The ratio of the diameter at 0.75 cumulative fraction to the diameter at 0.25 cumulative fraction is often used to indicate the breadth of the distribution.

A useful indication of particle size is reflected by the volume average particle diameter. The volume average particle diameter is given by the ratio of the fourth moment of the particle size distribution to the third moment of the particle size distribution.

$$\text{Volume Average diameter} = \frac{\Sigma n_i d_i^4}{\Sigma n_i d_i^3}$$

wherein $n_i$ is the number of all particles having diameter $d_i$ summed over all particle diameters.

Often, but not invariably the dispersed particles have a log normal distribution and the particle size density is given by:

$$p(x) = \frac{1}{\sqrt{2\pi}\ \sigma x} \exp\left(-0.5\left(\frac{\ln x - \mu}{\sigma}\right)^2\right)$$

where $p(x)$ is the particle density at diameter x, $\mu$ is a parameter indicating the location of the distribution, and $\sigma$ is a parameter indicating the spread or breadth of the distribution. In cases where the particle size distribution is log normal these two parameters, $\mu$ and $\sigma$, uniquely determine the distribution.

A useful (final) particle size may be characterized as a particle size having a volume average particle diameter from 0.01 to 15 micrometers. Preferably for high impact polystyrene type systems the volume average particle diameter will be from 0.5 to 15 micrometers. Preferably for the ABS, MBS and the ester (e.g. acrylate and methacrylate) resin type systems the volume average particle diameter will be from 0.05 to 5 micrometers. As noted above there are a number of bi- and poly- modal particle size distributions which give useful properties. Generally useful bi- or polymodal particle size distribution comprises from 100 to about 40% of small particles from about 0 to about 60% of medium sized particles and from 0 to 20 weight % of particles outside the specified sizes for small and medium particles. The ratio of volume average diameters of small to medium particles may range from 1:1.15 to 1:20 preferably from 1:1.3 to 1:6.

The reduction of the volume average diameter should be at least 20%, preferably not less than 30%.

The treatment of the present invention is carried out before the rubber becomes crosslinked and will not undergo size change upon shear. Typically, crosslinking of the rubber does not start to occur until the conversion is well above 75%. The degree of crosslinking of the rubber may be measured by the swelling index, determined using the test given below. The process of the present invention may be carried out at any conversion after particle formation and before crosslinking the rubber. Depending on the degree of mechanical agitation and the amount of rubber present in the syrup this may be at any time after about 4% conversion. However, in the preferred embodiment of making large particles and reducing the particle size it is believed advantageous to carry out the treatment after the conversion has reached a stage where the effects of diffusion of occluded resin phase after treatment will be minimized. Typically the treatment may be carried out at from 5 to 75% conversion.

There are a number of devices which may be used to shear the syrup in a controlled manner to cause a reduction in size of at least a portion of the particles in the dispersed rubber-like composite phase.

Preferably, the controlled shear device will comprise a stator and a rotor, most preferably with an adjustable gap there between, and a controlled or determined path length through which the syrup must flow.

The device may comprise a tubular stator member, such as a straight or tapered pipe, defining a plug flow. Inside the tubular member is a closed cylinder or cone which is the rotor. Preferably the rotor is movable within the stator to control either or both the clearance between the rotor and stator and the path length over which the fluid is subjected to shear. More particularly the device may be a Couette shear field generator comprising:

(i) a closed chamber having a circular cross section perpendicular to its longitudinal axis and at least one input port and at least one output port;

(ii) a cylinder within and concentric with said chamber, said cylinder having a circular cross section perpendicular to its longitudinal axis, a surface closely conforming to the internal surface of said chamber and occupying substantially all the space within said chamber except for a closely controlled clearance between the internal surface of the chamber and the external surface of the cylinder; and (iii) means for rotating said chamber and cylinder relative to each other.

Preferably the cylinder is a rotor and the chamber is a stator. Preferably, a drive means passes through one end of the chamber to rotate the cylinder relative to the chamber.

The internal shape of the chamber and the external shape of the cylinder conform and have a circular cross section perpendicular to the longitudinal axis. Suitable shapes for the chamber and cylinder include cylindrical, frustro-conical (tapered cylindrical), and conical. Spherical, hemi-spherical and parabolic shapes would likely be useful but may be more difficult to use in plant operations. A special shape would be a plate shaped stator or chamber and a plate shaped rotor. A further special configuration is a plate shaped stator with a conical shaped rotor or a conical stator with a plate shaped rotor.

Suitable ratios of dimensions for the shear field generator will depend upon the required residence time, the diameter of the rotor and the chamber and the speed of rotation. Clearance between the chamber wall and the surface of the rotor for a cylindrical chamber and rotor may be defined in terms of the ratio of the radius of the rotor (rr) to the radius of the chamber (rc). Typical ratios range from 0.999 to 0.750, preferably from 0.993 to 0.875. The ratio of the length to the diameter of the chamber (L/D ratio) should be greater than 0.25:1, preferably between 0.5:1 and 10:1 and most preferably between 0.5:1 to 3:1. Preferably, the input and output ports should be located at each end of the chamber.

A relatively uniform controlled shear field may also be provided by flowing said syrup through a device defining a closed chamber having a circular cross section perpendicular to its longitudinal axis, a continuous side wall and a conical projection along its longitudinal axis, said conical projection having a low apical angle, a planar end perpendicular to the longitudinal axis of said chamber and placed adjacent the apex of said conical projection and means for rotating said conical projection and said plate relative to each other. The apical angle is less than, 7 preferably less than 4, most preferably less than 2°. The gap between the tip of the cone and the plate should be minimal.

Typical shear rates range from about 2 to 2000 sec.$^{-1}$, preferably from about 4 to 1000 sec.$^{-1}$.

The residence time of the syrup as it flows through the device should approach the minimum time to obtain the required results. Typically the residence time should be less than 10 minutes, preferably less than 5 minutes, most preferably less than 3 minutes. Of course, the residence time will depend on the free volume within the chamber and the flow rate through the device. Typically the conversion of the monomers will be less than 5% preferably less than 2%, most preferably less than 1% within the controlled shear field.

The rotor should be attached to a drive means capable of driving the rotor at speeds up to several hundred RPM's. For most operations the rotor should be capable of operating at speeds between about 5 and about 500, preferably from 10 to 250 RPM's.

The temperature within the controlled shear field device should typically be maintained from about 80 to 180, more typically from 100° to 160° C. It is believed that under most conditions the process of present invention is insensitive over the range of pressures typical for the polymerization of the aforesaid materials.

In view of the relatively short residence time of the syrup as it passes through the device, the present invention provides a process in which there is a very short transition time between grades of impact modified thermoplastic having the same level of rubber but a different particle size distribution.

One of the advantages of the present invention is that the syrup may be divided into a number of streams and each stream may be individually treated and then two or more of the streams may be combined and further substantially polymerized. Such a procedure permits the formation of a bi- or multi- modal particle size distribution within the syrup. Accordingly, it is possible to select or control the particle size distribution within the syrup to try to optimize the balance among several finished properties such as gloss and toughness.

In accordance with the present invention it is possible to add additional resin monomers to the so treated inverted syrup (i.e. one in which the rubber phase is the dispersed phase). Suitable resin monomers have been discussed above.

A syrup polymerized under low shear conditions to the conversions indicated above tends to particulate to give a large particle size dispersed rubber-like composite phase. The resulting particles tend to have a volume average diameter of greater than 6, preferably from 6.5 to 15, most preferably greater than 8 micrometers. It should be noted that the rubber-like composite phase does not comprise only rubber but includes grafted and occluded resin. More importantly the occluded resin phase within the dispersed phase tends to be less likely to diffuse out of the dispersed phase at higher conversions. The resulting syrup is then treated with the device of the present invention to reduce the volume average particle diameter.

A reactor or a chain of reactors having low mechanical shear such as a plug flow reactor may be used to produce such a syrup. Upon inversion or dispersion the rubber phase will be distributed throughout the continuous resin phase as fairly large uniform particles. The plug flow reactors should have a length to diameter ratio of greater than about 3:1, preferably from about 5:1 to 15:1, most preferably about 9:1. The reactors may contain an anchor or wiper type stirrer or possibly turbine type agitators to provide for movement of the syrup for heat transfer requirements but should not provide any high shear agitation as this will tend to cause the formation of a small particle size distribution.

Care should be taken in practising the process of the present invention. It is believed that under extreme conditions of shear and pressure it is possible to departiculate a particulated syrup to a post inversion metastable syrup in which the rubber-like composite phase and resin phase are continuous or co-continuous.

The point between altering the volume average diameter of the dispersed rubber-like composite phase and departiculation will depend on a number of factors including the type and configuration of equipment used, the degree of polymerization of the syrup and the viscosity of the syrup. While it is difficult to scale up from laboratory equipment to plant scale equipment the relative magnitudes of shear and pressure on each side of the crossover point may be examined using a high shear device such as a gear pump with a restricted discharge port. Several samples of the syrup may be placed in a high shear and pressure device and subjected to different shear rates and pressures. The resulting samples are then polymerized in a glass tube to completion and the product is then analyzed by the test for particulation and TEM (as set forth below) to determine the effect of shear and pressure on the syrup. By observing the morphology of the sample and correlating it to shear rate and pressure it may be possible to define the conditions where the crossover point from altering the particle size distribution of the dispersed rubber-like composite phase to departiculation to a metastable syrup. Generally, it is believed that the shear rates and pressures to cause the syrup to departiculate to a metastable state are quite high. Using such a procedure it is also possible to define or plot a graph indicating the relationship between particle size and shear.

After an appropriate particle size distribution of has been obtained in the syrup, the syrup may be polymerized in a conventional manner. The morphology of the rubber-like composite phase particles in the resin phase will be fixed as the rubber becomes crosslinked. Typically, the syrup will pass through one or more reactors to raise the conversion to as close to complete as possible with out degradation of the product and within the time limits of "normal" commercial processes for polymerization. Typically this conversion will be greater than 65% preferably from about 70 to about 90%. The syrup will then be fed to a preheater and devolatilized in a conventional manner. The devolatilized polymer may then be extruded as strands and chopped into pellets.

From an apparatus point of view the present invention provides a typical apparatus for the polymerization of impact modified polymers in cooperation with one or more devices to subject the syrup to a relatively uniform controlled shear field. For the sake of simplicity the type of device useful in accordance with the present invention will be described in the context of devices used to make an impact modified polymer such as high impact polystyrene (HIPS) which will be described in relationship to FIG. 1 which is a schematic drawing of a plant for the polymerization of such an impact polymer using three reactors.

Figure 1:
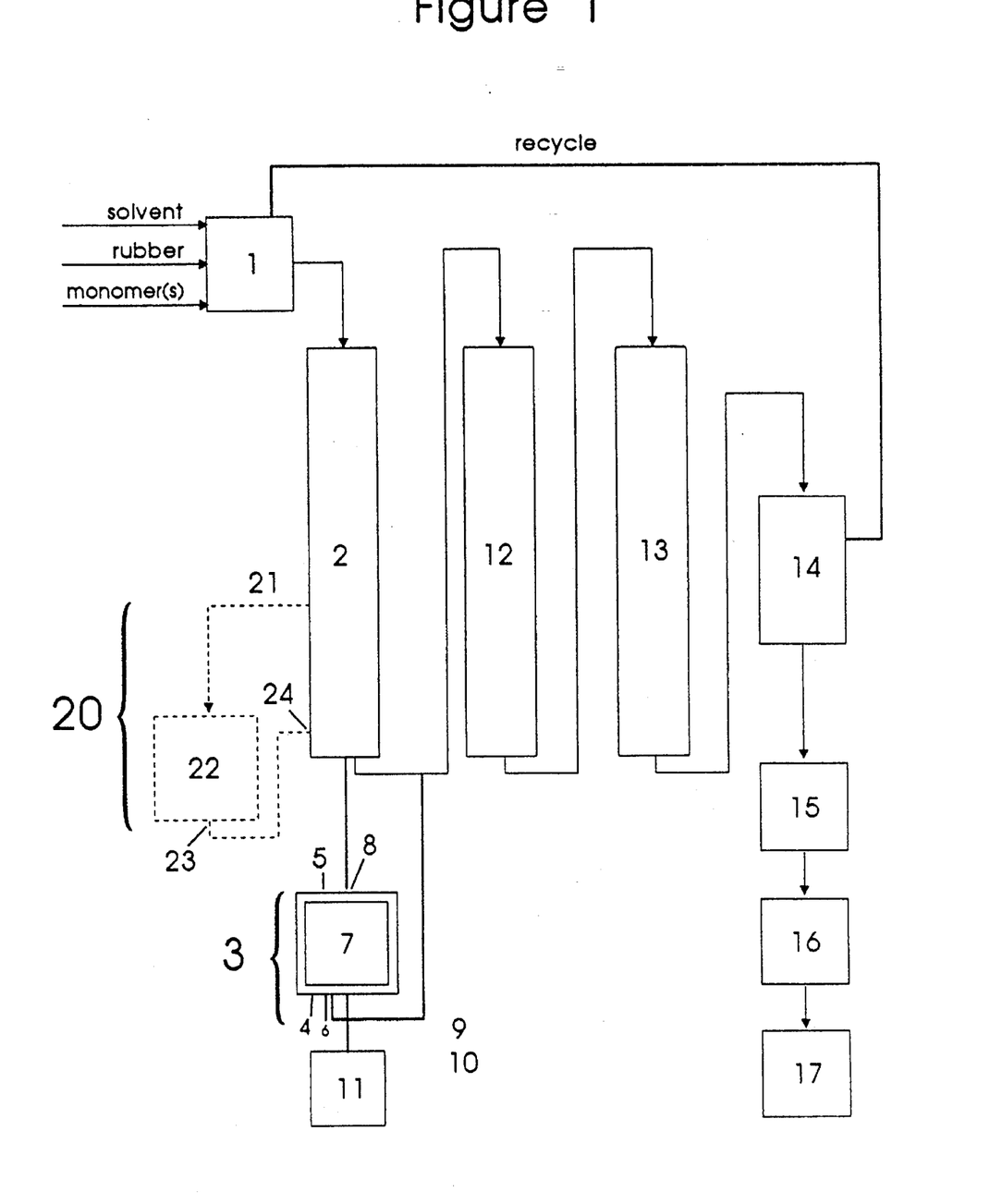
FIG. 1 is a schematic drawing of a plant for the production of an impact modified polymer such as high impact polystyrene (HIPS) by a continuous mass polymerization using a sequence of reactors.

Typically in the polymerization of an impact modified polymer, up to about 20 weight %, preferably from about 3 to 12 weight %, most preferably from 4 to 10 weight % of non-crosslinked rubber, is dissolved in one or more monomers, and optionally solvent, in a dissolver tank 1. The solution of rubber in monomer and optionally solvent is then fed to a first reactor 2, in a series of, in this case three, horizontal or vertical reactors. The monomers are partially polymerized under low shear (with no or very low agitation) to form a syrup in which the resin phase forms the continuous phase and the rubber-like composite phase forms the discontinuous phase. The syrup leaves reactor 2, and all or part of the syrup passes through one or more Couette shear field generator(s) (particulator(s)) generally indicated at 3. While not shown in the drawings the syrup from reactor 2 may be passed to two or more particulators to generate a bi- or multi-modal particle size distribution.

The Couette shear field generator comprises a closed chamber 4 having ends 5 and 6, and a continuous smooth symmetrical surface about the longitudinal axis of the chamber and having within it a rotor which is a closed (e.g. —not annular) cylinder 7 closely conforming to the shape of the chamber. The rotor substantially occupies the volume of the chamber except for a closely controlled gap. The gap between the internal surface of the chamber 4 and the external surface of the cylinder 7 is small and closely controlled. Chamber 4 has an inlet 8 and an outlet 9. Drive means 10 passes through at least one of the closed ends, in this case 6, of chamber 4. The drive means is attached to a power means 11, such as an electric motor.

The syrup from reactor 2, then is transferred into second reactor 12 where more of the resin phase is polymerized. While not shown in the drawings it would be possible to have all or part of the syrup leaving reactor 12 pass through one or more particulators.

The syrup from reactor 12 is then transferred to reactor 13 where the resin phase is further polymerized. While not shown in the drawings it would be possible to have all or part of the syrup leaving reactor 13 pass through one or more particulators.

The syrup from reactor 13 then is passed to a devolatilizer 14. In the devolatilizer most of the residual monomer and solvent are removed from the syrup. The monomer and solvent are recycled.

The product then passes through a die plate 15, from which the product is extruded as strands. The strands pass through a cooling step 16. Typically the strands pass through baths of cooling water. The strands are then pelletized in a pelletizer 17.

As shown in the broken lines it would be possible to place a particulator 20, at a location other than the exit from the first reactor. For example reactor 2 could have an exit port 21, somewhere prior to the end of the reactor. The exit port 21 could be connected to inlet 22 of particulator 20. The syrup would pass through the particulator 20 and leave the particulator's outlet 23 and be returned to reactor 2 by an inlet port 24 which is down stream from outlet port 21. Additionally, the Couette shear field generator could be located at the exit of any reactor, provided the rubber had not crosslinked. A further alternative could be to place the Couette shear field generator immediately prior to the devolatilizer 14.

The Couette shear field generator may be used in a number of ways. A stream of syrup could be split into two or more streams each of which could be treated to generate a particular particle size distribution. The streams could then be blended and the polymerization finished. This would permit the production of a product with two or more particle size distributions for the dispersed rubber-like composite phase so that a number properties could be enhanced for example such as toughness and gloss.

It will be recognized that the above description is of one embodiment of the invention. Other configurations and applications for the present invention will be apparent to those skilled in the art.

EXAMPLES

The present invention will be illustrated by the following examples which are not intended to limit the invention. In the examples, unless otherwise indicated parts means parts by weight and % means weight %.

Controlled shear device:

For laboratory scale experiments a Couette shear field generating device (particulator) was custom made. The device contained a cylindrical chamber 2 inches deep and 2 inches in diameter (an L/D ratio of 1:1). The chamber had an external heating jacket with two ports to flow hot oil through, which were connected to a heating/circulating oil bath to provide temperature control. The top of the chamber was removable. A drive shaft passed through a seal in the top of the chamber. One end of the drive shaft was attachable to an electric motor and the other end was attachable to a cylindrical rotor. Several cylindrical rotors were machined for the device. The rotors essentially filled the chamber. The rotors were machined to provide the following wall clearances between the surface of the rotor and the surface of the chamber: 0.03125, 0.06250, 0.1250 and 0.2500 inches. When the rotors were installed in the device the following volumes are obtained: 6.4, 12.3, 24.1, 45.1 mL, respectively. At the bottom of the chamber was an inlet port to flow syrup into the chamber and at the top of the chamber was an outlet port to permit the flow of treated syrup out of the device. The shear rate the syrup was exposed to in the device could be changed by varying the rotor rpm or the rotor gap. Syrup temperatures were measured at the inlet and outlet of the device and recorded. The entire device was made from stainless steel.

Plug flow reactors:

The plug flow reactors each consisted of three modules 6.3 inches in length and 2.1 inches in diameter and were bolted together through flanges. The total volume of each the reactors was about 1.0 L. Each reactor module had an external heating jacket with two ports to flow hot oil through and were connected to its own heating/circulating oil baths to provide individual temperature control. The top of the reactor was removable and equipped for mechanical agitation. A drive shaft passed through a seal in the top of the reactor. One end of the drive shaft was attachable to an electric motor and the other end was attachable to an agitator. Different agitator designs were used and are specified in the each example. Batch (syrup) temperature were measured at the inlet and outlet of each reactor module and recorded. The temperature in all transfer lines was controlled. The entire reactor was made from stainless steel.

Laboratory scale reactor train (type-I):

The feed solution was fed from a dissolving tank to a gear pump which delivered the feed solution to the bottom inlet port of a plug flow reactor. The syrup exited the plug flow reactor through the top outlet port and was delivered to the bottom inlet port of the controlled shear device. The syrup exited the top outlet port of the controlled shear device and was collected for analysis or advancement.

Laboratory scale reactor train (type II):

The feed solution was fed from a dissolving tank to a gear pump which delivered the feed solution to the bottom inlet port of the first plug flow reactor. The syrup exited the first plug flow reactor through the top outlet port and was delivered to the bottom inlet port of the second plug flow reactor. The syrup exited the second plug flow reactor through the top outlet port and was delivered to the bottom inlet port of the controlled shear device. The syrup exited the top outlet port of the controlled shear device and was collected for analysis or advancement.

Polymerizations:

Using one of the above reactor trains a series of experiments were carried out. Styrene containing 8 weight % of a medium cis rubber was polymerized by thermal or 0.028% t-butylperoxyacetate initiation under low mechanical agitation. Samples of the resulting syrup were taken after one or both plug flow reactors and after the controlled shear device. The syrup samples were advanced at 140° C. for 24 hours and then devolatilized at 220° C. for 30 minutes in a vacuum oven under reduced pressure (~5 mm Hg). The resulting samples of rubber modified polystyrene then subjected to analysis. For mechanical testing the devolatilized polymer was pelletized and molded in a standard ASTM test piece mold.

Test for Particulation:

Three tenths of a gram of a devolatilized HIPS resin is shaken in 15 ml of 2-butanone (MEK) and inspected for visible gel particles. A well particulated HIPS resin will appear as a milk like suspension, while a non-particulated HIPS resin (one with a co- or continuous rubber phase) will appear as a single gel particle in a clear solution. "Partially particulated" HIPS resins are ones that fall between these two extremes.

Measurement of Swelling Index and Gel Content:

Approximately one gram of polymer is accurately weighed and dissolved in 40 mL toluene and centrifuged at 17,000 rpm, at −7° C., for two hours. The supernatant liquid is decanted, 40 mL of fresh toluene is added to the precipitated gel, and the mixture treated in an ultrasonic bath for two hours. The sample is then centrifuged at 17,000 rpm and −7° C. for two hours. The supernatant liquid is decanted. The wet gel is weighed and then dried and weighed again. The swelling index is calculated by dividing the wet gel weight by the dry gel weight, and the gel level is calculated by dividing the dry gel level by the initial sample weight.

Particle Size Measurement:

An Horiba photosedimentometer was used for particle size analysis. A typical procedure involves dispersing enough HIPS resin such that the starting absorbance of the instrument lies between 0.75 and 0.85 in 10 mL of MEK. The sample is inspected for complete dispersion and is measured immediately in centrifugal mode. The machine reports area median. The output was fitted to a log normal distribution, where appropriate, to calculate the appropriate values for the characterization of the particle size distribution.

Transmission Electron Microscopy (TEM) and Dispersed Phase Volume Fraction Analysis (DPVF):

TEM were taken of selected samples using routine methods.

Syrup Solids:

Syrup solids were determined using gravimetric analysis by devolatilizing the sample at high temperature (220° C.) and reduced pressure (5 mm Hg).

Example 1:

The feed syrup comprised 8% medium cis polybutadiene in styrene. The syrup was fed at a rate of 435 mL/hr into the type I reactor train and was thermally initiated. The jackets of the plug flow reactor (SPFR-1) and the particulator were all maintained at 125° C. An anchor agitator with a 0.125 inch wall clearance was used in SPFR-1 and was operated at 20 RPM. The 0.125 inch wall clearance spindle was used in the particulator and was operated at various RPM. The volume average particle diameter was measured for the syrup leaving SPFR-1 and leaving the particulator after sufficient volume had flowed through the particulator after a change in rotor speed to ensure the new particle size distribution was obtained.

The results of the example are set forth in Table 1.

TABLE 1

| Reactor | Agitator/ Spindle RPM | Syrup Solids % | Volume Average Diameter μM |
|---|---|---|---|
| SPFR-1 | 20 | 24.72 | 5.06 |
| Particulator | 20 | 25.58 | 3.95 |
| Particulator | 30 | 24.43 | 2.47 |
| Particulator | 40 | 25.16 | 2.07 |
| Particulator | 80 | 26.94 | 1.34 |

Example 2:

The feed syrup comprised 8% medium cis polybutadiene in styrene. The syrup was fed at a rate of 250 mL/hr into the type I reactor train and was thermally initiated. The jackets of the plug flow reactor (SPFR-1) and the particulator were all maintained at 125° C. An anchor agitator with a 0.125 inch wall clearance was used in SPFR-1 and was operated at 20 RPM. The 0.125 inch wall clearance spindle was used in the particulator and was operated at various RPM. The volume average particle diameter was measured for the syrup leaving SPFR-1 and leaving the particulator after sufficient volume had flowed through the particulator after a change in rotor speed to ensure the new particle size distribution was obtained.

The results of the example are set forth in Table 2.

TABLE 2

| Reactor | Agitator/ Spindle RPM | Syrup Solids % | Volume Average Diameter μM |
|---|---|---|---|
| SPFR-1 | 20 | 37.93 | 6.01 |
| Particulator | 30 | 38.23 | 4.50 |
| Particulator | 60 | 38.04 | 2.91 |
| Particulator | 90 | 39.18 | 2.23 |
| Particulator | 120 | 38.78 | 2.03 |
| Particulator | 240 | 38.74 | 1.59 |

Example 3:

The feed syrup comprised 8% medium cis polybutadiene in styrene. The syrup was fed at a rate of 435 mL/hr into the type I reactor train and was thermally initiated. The jackets of the plug flow reactor (SPFR-1) and the particulator were all maintained at 130° C. An anchor agitator with a 0.250 inch wall clearance was used in SPFR-1 and was operated at 30 RPM. The 0.125 inch wall clearance spindle was used in the particulator and was operated at various RPM. The volume average particle diameter was measured for the syrup leaving SPFR-1 and leaving the particulator after sufficient volume had flowed through the particulator after a change in rotor speed to ensure the new particle size distribution was obtained.

The results of the example are set forth in Table 3.

TABLE 3

| Reactor | Agitator/ Spindle RPM | Syrup SOlids % | Volume Average Diameter μM |
|---|---|---|---|
| SPFR-1 | 30 | 45.43 | 7.41 |
| Particulator | 30 | 49.45 | 5.26 |
| Particulator | 60 | 48.53 | 2.03 |
| Particulator | 90 | 51.31 | 2.39 |
| Particulator | 120 | 49.19 | 2.28 |
| Particulator | 200 | 50.07 | 1.61 |

Example 4:

The feed syrup comprised 8% medium cis polybutadiene in styrene. The syrup was fed at a rate of 435 mL/hr into the type I reactor train and was thermally initiated. The jackets of the plug flow reactor (SPFR-1) and the particulator were all maintained at 130° C. An anchor agitator with a 0.250 inch wall clearance was used in SPFR-1 and was operated at 40 RPM. The 0.125 inch wall clearance spindle was used in the particulator and was operated at various RPM. The volume average particle diameter was measured for the syrup leaving SPFR-1 and leaving the particulator after sufficient volume had flowed through the particulator after a change in rotor speed to ensure the new particle size distribution was obtained.

The results of the example are set forth in Table 4.

TABLE 4

RESULTS OF EXAMPLE 4

| Reactor | Agitator/ Spindle RPM | Syrup Solids % | Volume Average Diameter μM |
| --- | --- | --- | --- |
| SPFR-1 | 40 | 47.74 | 6.36 |
| Particulator | 30 | 47.61 | 5.73 |
| Particulator | 60 | 49.78 | 4.09 |
| Particulator | 90 | 46.65 | 2.24 |
| Particulator | 120 | 46.82 | 3.43 |
| Particulator | 240 | 47.05 | 2.77 |

Example 5:

The feed syrup comprised 8% of medium cis polybutadiene and 0.5% of mineral oil in styrene. The syrup was fed at a rate of 435 mL/hr into the type II reactor train and was thermally initiated. The jackets of the first plug flow reactor (SPFR-1) and second plug flow reactor (SPFR-2) were operated in increasing temperature as follows 120°, 122°, 124°, 126°, and 128° C. The jacket of the particulator was maintained at 120° C. An anchor agitator with 0.250 inch wall clearance was used in SPFR-1 and was operated at 30 RPM. In SPFR-2 an agitator with alternating rods and mounted pitched slotted baffles was used and was operated at 15 RPM. The 0.125 inch wall clearance spindle was used in the particulator and was operated at various RPM. Additionally, material obtained from the particulator when the spindle was operated at 60 RPM was molded into test specimens to determine the physical properties of the sample.

The results of the particle sizing aspect of the example are set forth in Table 5.

TABLE 5

THE RESULTS OF THE PARTICLE SIZING ASPECT OF THE EXAMPLE

| Reactor | Agitator/ Spindle RPM | Syrup SOlids % | Volume Average Diameter μM |
| --- | --- | --- | --- |
| SPFR-1 | 30 | 26.67 | 7.02 |
| SPFR-2 | 15 | 48.10 | 5.01 |
| Particulator | 30 | 48.7 | 2.37 |
| Particulator | 60 | 48.7 | 1.66 |
| Particulator | 90 | 48.7 | 1.38 |
| Particulator | 150 | 48.7 | 1.30 |

The results of the physical tests upon the specimens of resin obtained from the experiment when the particulator was operated at 60 RPM are set forth in Table 6.

TABLE 6

PHYSICAL PROPERTIES OF SAMPLES

| Test | Test Method | Result |
| --- | --- | --- |
| Izod impact | ASTM D256 | 3.3 |

TABLE 6-continued

PHYSICAL PROPERTIES OF SAMPLES

| Test | Test Method | Result |
| --- | --- | --- |
| (Ft-lbs/in.) | | |
| Tensile Yield (PSI) | ASTM D638 | 5134 |
| Tensile Fail (PSI) | ASTM D638 | 4316 |
| Modulus (KPSI) | ASTM D638 | 327 |
| Melt Flow Index (g/10 min) | ASTM D1238 | 1.02 |
| Gloss (60°) | ASTM D523 | 64.8 |

Of the samples of commercially available high impact polystyrene applicants are aware of the best balance of properties are an izod in the range from about 2.5 to about 3 ft-lbs/in. and a gloss from about 50 to 70%. The present example demonstrates that the present invention provides a simple effective process to obtain a broader balance of properties.

Figure 2:
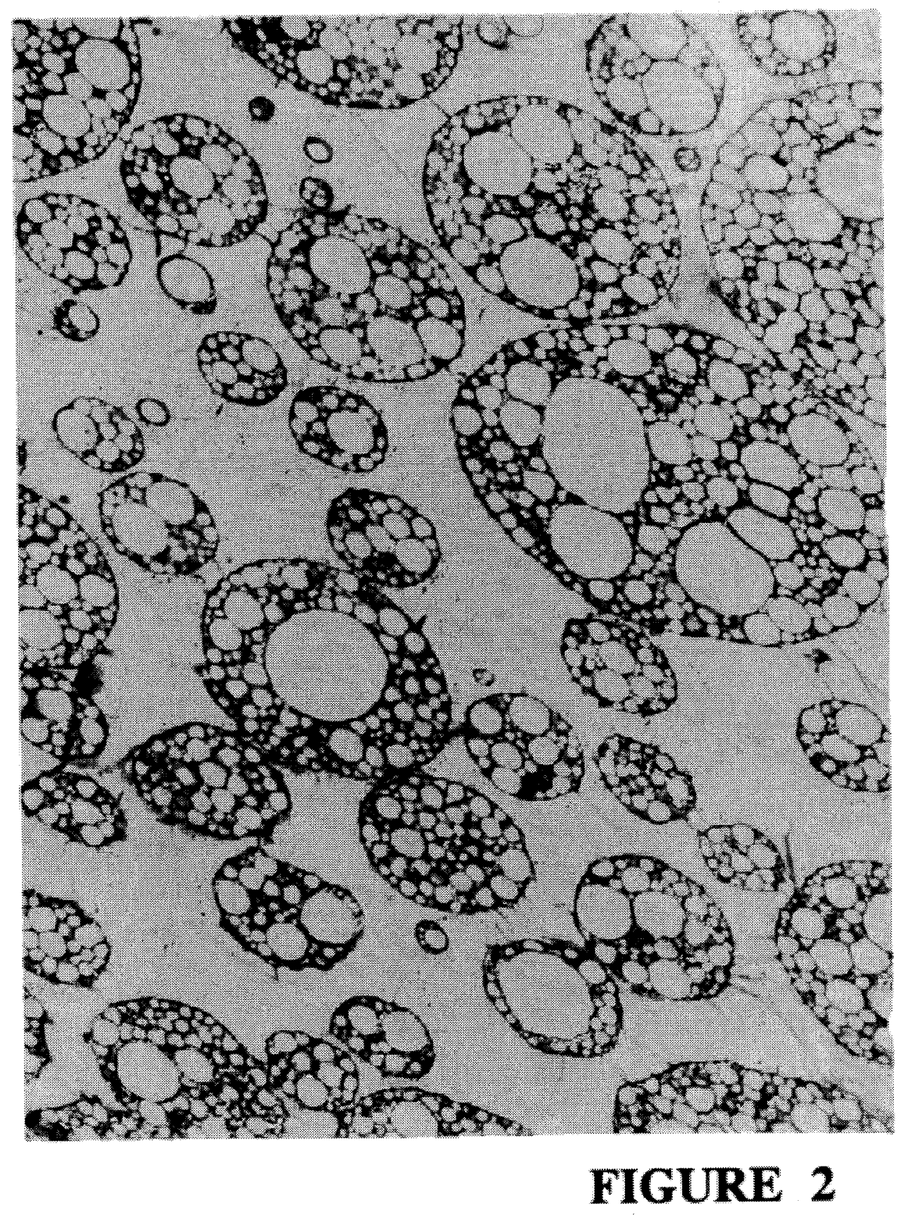
FIG. 2 is a transmission electron micrograph (7,500×) of an advanced and devolatilized sample obtained from the first stirred plug flow reactor at 26.78% solids in example 5. Volume average diameter=7.02 μM.
Figure 3:
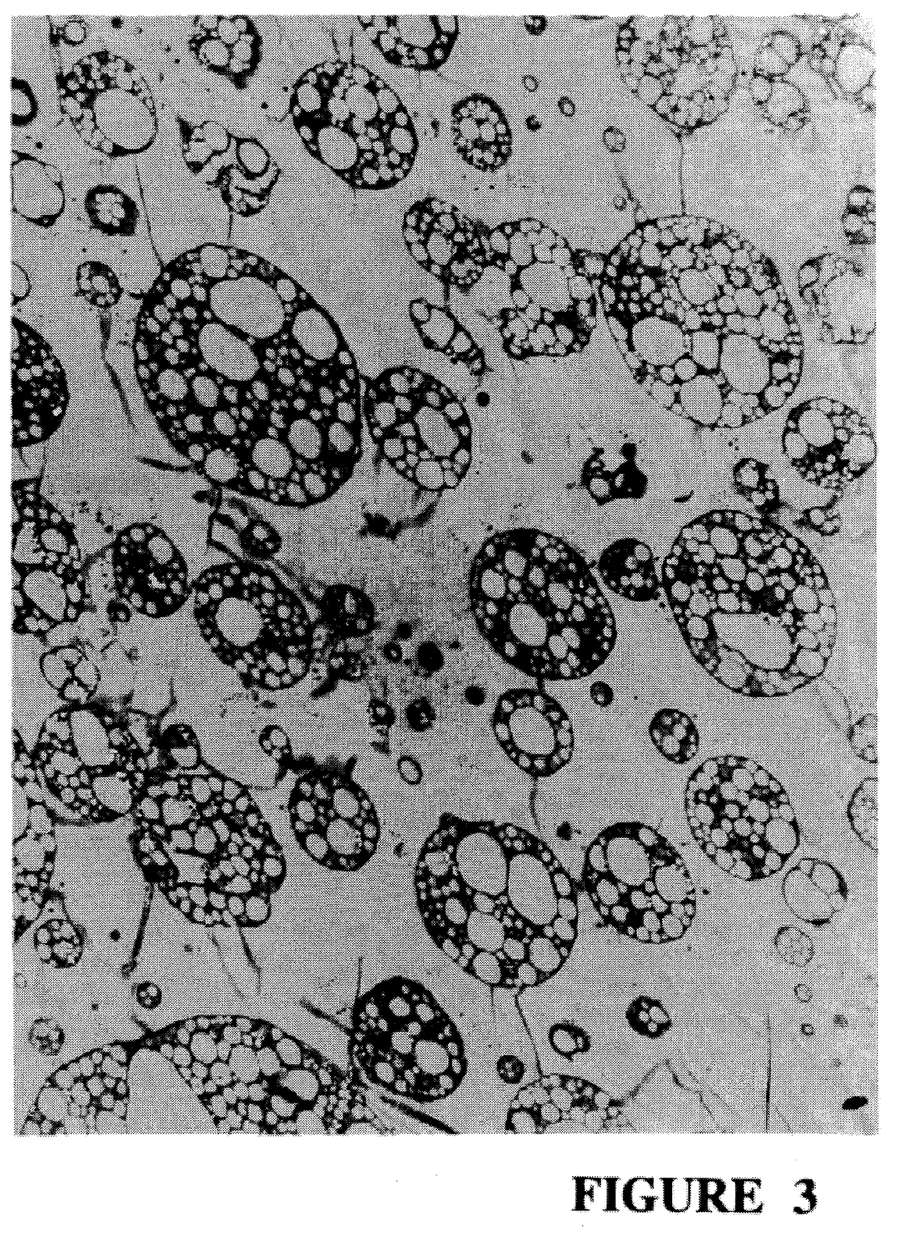
FIG. 3 is a transmission electron micrograph (7,500×) of an advanced and devolatilized sample obtained from the second stirred plug flow reactor at 47.63% solids in example 5. Volume average diameter=5.01 μM.
Figure 4:
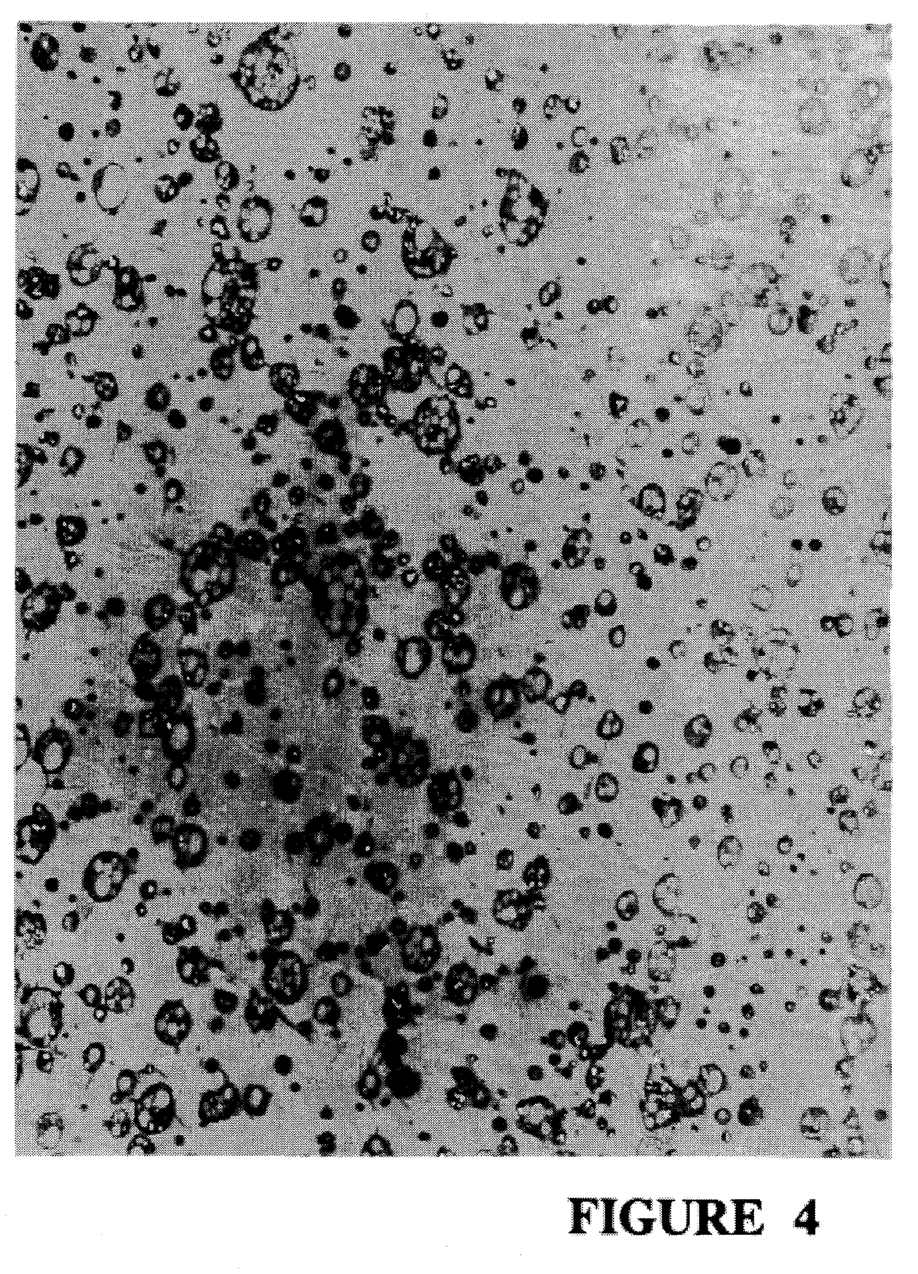
FIG. 4 is a transmission electron micrograph (7,500×) of an advanced and devolatilized sample obtained from the Couette shear field generating device (particulator, spindle rotation=60 RPM) at 48.70% solids in example 5. Volume average diameter=1.66 μM.

FIG. 2 is an electron micrograph of an advanced sample of syrup exiting the first plug flow reactor (SPFR-1). The particle size is 7.01 micrometers. FIG. 3 is an electron micrograph of a syrup taken from the second plug flow reactor (SPFR-2) which was advanced to completion. The particle size has now been reduced to 5.01 micrometers. FIG. 4 is an electron micrograph of a syrup treated in the particulator at a spindle rotation of 60 RPM. The figures clearly demonstrate the sizing of particles using a uniform shear field.

Example 6:

The feed syrup comprised 8% of medium cis polybutadiene and 0.5% of mineral oil in styrene. The syrup was fed at a rate of 435 mL/hr into the type II reactor train and was thermally initiated. The jackets of the first plug flow reactor (SPFR-1) and second plug flow reactor (SPFR-2) were operated in increasing temperature as follows 120°, 122°, 124°, 128°, 130° and 132° C. The jacket of the particulator was maintained at 120° C. An agitator with alternating rods and mounted pitched slotted baffles was used in SPFR-1 and was operated at 30 RPM. In SPFR-2 two stationary baffle plates were used to break the reactor into three chambers and an agitator with mounted rods was used and was operated at 15 RPM. The 0.125 inch wall clearance spindle was used in the particulator and was operated at various RPM.

The results of the example are set forth in Table 7.

TABLE 7

THE RESULTS OF EXAMPLE 6

| Reactor | Agitator/ Spindle RPM | Syrup Solids % | Volume Average Diameter μM |
| --- | --- | --- | --- |
| SPFR-1 | 30 | 25.14 | 5.67 |
| SPFR-2 | 15 | 54.64 | 5.12 |
| Particulator | 15 | 59.96 | 3.92 |
| Particulator | 30 | 57.44 | 2.30 |
| Particulator | 60 | 56.04 | 1.68 |
| Particulator | 90 | 57.12 | 1.41 |

Example 7:

The feed syrup comprised 8% of medium cis polybutadiene and 0.028% of t-butylperoxyacetate in styrene. The syrup was fed at a rate of 435 mL/hr into the type II reactor train and was initiated. The jackets of the first plug flow reactor (SPFR-1) and second plug flow reactor (SPFR-2) were operated in increasing temperature as follows 107°, 109°, 111°, 112°, 114° and 116° C. The jacket of the particulator was maintained at 120° C. An agitator with alternating rods and mounted pitched slotted baffles was used in SPFR-1 and was operated at 15 RPM. In SPFR-2 two stationary baffle plates were used to break the reactor into three chambers and an agitator with mounted rods was used and was operated at 15 RPM. The 0.125 inch wall clearance spindle was used in the particulator and was operated at various RPM.

The results of the example are set forth in Table 8.

TABLE 8

THE RESULTS OF EXAMPLE 7

| Reactor | Agitator/ Spindle RPM | Syrup Solids % | Volume Average Diameter μM |
|---|---|---|---|
| SPFR-1 | 15 | 22.02 | 9.02 |
| SPFR-2 | 15 | 44.48 | 5.72 |
| Particulator | 15 | 46.18 | 4.84 |
| Particulator | 30 | 46.18 | 3.08 |
| Particulator | 60 | 45.61 | 2.31 |
| Particulator | 90 | 46.02 | 2.25 |

Example 8:

The feed syrup comprised 8% of medium cis polybutadiene in styrene. The syrup was fed at a rate of 869 mL/hr into the type II reactor train and was thermally initiated. The jackets of the first plug flow reactor (SPFR-1) and second plug flow reactor (SPFR-2) were operated in increasing temperature as follows 128°, 130°, 132°, 128°, 130° and 132° C. The jacket of the particulator was maintained at 120° C. An agitator with alternating rods and mounted pitched slotted baffles was used in SPFR-1 and was operated at 30 RPM. In SPFR-2 two stationary baffle plates were used to break the reactor into three chambers and an agitator with mounted rods was used and was operated at 20 RPM. The 0.125 inch wall clearance spindle was used in the particulator and was operated at various RPM.

The results of the example are set forth in Table 9.

TABLE 9

THE RESULTS OF EXAMPLE 8

| Reactor | Agitator/ Spindle RPM | Syrup Solids % | Volume Average Diameter μM |
|---|---|---|---|
| CPFR-1 | 30 | 26.53 | 7.95 |
| SPFR-2 | 20 | 38.13 | 6.01 |
| Particulator | 15 | 37.87 | 4.74 |
| Particulator | 30 | 37.52 | 4.31 |
| Particulator | 60 | 38.04 | 2.66 |
| Particulator | 90 | 40.41 | 2.13 |
| Particulator | 150 | 39.49 | 1.85 |

The above data demonstrate that it is possible to control particle size distribution using the process of the present invention. More specifically the data within each table of all the examples shows particulated syrups which had essentially the same chemical composition and essentially similar conversions can be treated in the uniform shear field generating device (particulator) to produce a different particle size distribution.

Overall, the above data shows that the process of the present invention is able to expand the range of properties of an impact modified resin beyond that currently available under the present art.

What is claimed is:

1. A process to decrease the volume average diameter of the particle distribution of a dispersed rubber-like composite phase in a particulated syrup consisting essentially of a discontinuous rubber-like composite phase and a continuous resin phase consisting essentially of:

(i) from 99 to 80 weight % of a resin phase selected from the group consisting of:
(a) homopolymers of $C_{8-12}$ vinyl aromatic monomers which are unsubstituted or substituted by a $C_{1-4}$ alkyl radical;
(b) copolymers consisting essentially of:
(1) from 50 to 90 weight % of one or more $C_{8-12}$ vinyl aromatic monomers which are unsubstituted by a $C_{1-4}$ alkyl radical; and
(2) from 10 to 50 weight % of one or more monomers selected from the group consisting of $C_{1-8}$ alkyl esters of acrylic or methacrylic acid, acrylonitrile, methacrylonitrile, and maleic anhydride; and (ii) from 1 to 20 weight % of rubber selected from the group consisting of:
(a) co- or homopolymers of $C_{4-6}$ conjugated diolefins;
(b) random, block, and tapered copolymers comprising from 10 to 80 weight % of one or more $C_{8-12}$ vinyl aromatic monomers which are unsubstituted or substituted by a $C_{1-4}$ alkyl radical; and from 20 to 90 weight % of one or more $C_{6-8}$ conjugated diolefins; and
(c) copolymers comprising from 5 to 50 weight % of acrylonitrile or methacrylonitrile and from 50 to 95 weight % of one or more $C_{4-6}$ conjugated diolefins, which has been polymerized to a conversion from 5 to 75% conversion comprising subjecting at least a portion of said syrup to a relatively uniform controlled shear field from 2 to 2,000 $sec^{-1}$ by flowing said portion of said syrup through a device comprising:

(i) a chamber having a circular cross section perpendicular to its longitudinal axis, at least one input port and at least one output port and a ratio of length to diameter from 0.5:1 to 3:1;

(ii) a cylinder within and occupying substantially the volume of said chamber said cylinder having a circular cross section perpendicular to its longitudinal axis, a surface closely conforming to the internal surface of the chamber except for a closely controlled clearance between the internal surface of the chamber and the external surface of the cylinder defined by the ratio of the radius of the chamber to the radius of the cylinder being from 0.993 to 0.875; and (iii) means for rotating at least one of said cylinder and said chamber relative to each other, for a time to cause less than 2% conversion of said syrup and reduce the volume average diameter of the dispersed rubber-like composite by 20% to a final volume average diameter from 0.01 to 15 microns.

2. The process according to claim 1, wherein said syrup consists essentially of from 3 to 12 weight % of rubber and from 97 to 88 weight % of said resin phase.

3. The process according to claim 2 wherein in said resin phase said vinyl aromatic monomer is selected from the group consisting of styrene, alpha methyl styrene, paramethyl styrene, and p-t-butyl styrene and said $C_{1-8}$ alkyl ester of acrylic or methacrylic acid is selected from the group consisting of methyl methacrylate, ethyl methacrylate, methyl acrylate, ethyl acrylate, butyl acrylate and ethylhexyl acrylate.

4. The process according to claim 3 wherein said syrup has been polymerized to a conversion of between 5 and 20%.

5. The process according to claim 4, wherein said resin phase is a homopolymer of styrene; said rubber phase is polybutadiene and the final volume average diameter of the dispersed rubber-like composite phase is from 0.5 to 15 micrometers.

6. The process according to claim 5, further comprising polymerizing said syrup to crosslink the rubber and fix the particle size of the dispersed rubber-like composite phase.

7. The process according to claim 6, further comprising devolatilizing said polymerized syrup.

8. The process according to claim 7, wherein said at least a portion of said syrup is all of said syrup.

9. The process according to claim 7, wherein said syrup is divided into two or more portions each of which is subjected to a different controlled shear field.

10. The process according to claim 9 wherein two or more portions of said syrup which have been subjected to different controlled shear fields are recombined prior to further substantial polymerization.

11. The process according to claim 4 wherein said resin phase is a copolymer consisting essentially of:
   (1) from 50 to 90 weight % of styrene; and
   (2) from 10 to 50 weight % of one or more monomers selected from the group consisting of acrylonitrile and methacrylonitrile, said rubber is polybutadiene; and the final volume average diameter of the dispersed rubber-like composite phase is from 0.05 to 5 micrometers.

12. The process according to claim 11, further comprising polymerizing said syrup to crosslink the rubber and fix the particle size of the dispersed rubber-like composite phase.

13. The process according to claim 12, further comprising devolatilizing said polymerized syrup.

14. The process according to claim 13, wherein said at least a portion of said syrup is all of said syrup.

15. The process according to claim 13, wherein said syrup is divided into two or more portions each of which is subjected to a different controlled shear field.

16. The process according to claim 5 wherein two or more portions of said syrup which have been subjected to different controlled shear fields are recombined prior to further substantial polymerization.

17. The process according to claim 4, wherein said resin phase is a copolymer consisting essentially of:
   (1) from 50 to 90 weight % of styrene; and
   (2) from 10 to 50 weight % of one or more monomers selected from the group consisting of methyl methacrylate and ethyl acrylate,
said rubber is polybutadiene; and the final volume average diameter of the dispersed rubber-like composite phase is from 0.05 to 5 micrometers.

18. The process according to claim 17, further comprising polymerizing said syrup to crosslink the rubber and fix the particle size of the dispersed rubber-like composite phase.

19. The process according to claim 18, further comprising devolatilizing said polymerized syrup.

20. The process according to claim 19, wherein said at least a portion of said syrup is all of said syrup.

21. The process according to claim 19, wherein said syrup is divided into two or more portions each of which is subjected to a different controlled shear field.

22. The process according to claim 21 wherein two or more portions of said syrup which have been subjected to different controlled shear fields are recombined prior to further substantial polymerization.

23. The process according to claim 3, wherein said syrup has been polymerized to from 20 to 75% conversion and said dispersed rubber-like composite phase has an initial volume average diameter of from 6 to 15 microns.

24. The process according to claim 23, wherein said resin phase is a homopolymer of styrene; said rubber phase is polybutadiene and the final volume average diameter of said dispersed rubber-like composite phase is from 0.5 to 15 micrometers.

25. The process according to claim 24, further comprising polymerizing said syrup to crosslink the rubber and fix the particle size of the dispersed rubber-like composite phase.

26. The process according to claim 25, further comprising devolatilizing said polymerized syrup.

27. The process according to claim 26, wherein said at least a portion of said syrup is all of said syrup.

28. The process according to claim 26, wherein said syrup is divided into two or more portions each of which is subjected to a different controlled shear field.

29. The process according to claim 28, wherein two or more portions of said syrup which have been subjected to different controlled shear fields are recombined prior to further substantial polymerization.

30. The process according to claim 23, wherein said resin phase is a copolymer consisting essentially of:
   (1) from 50 to 90 weight % of styrene; and
   (2) from 10 to 50 weight % of one or more monomers selected from the group consisting of acrylonitrile and methacrylonitrile,
said rubber is polybutadiene; and the final volume average diameter of the dispersed rubber-like composite phase is from 0.05 to 5 micrometers.

31. The process according to claim 30, further comprising polymerizing said syrup to crosslink the rubber and fix the particle size of the dispersed rubber-like composite phase.

32. The process according to claim 31, further comprising devolatilizing said polymerized syrup.

33. The process according to claim 32, wherein said at least a portion of said syrup is all of said syrup.

34. The process according to claim 32, wherein said syrup is divided into two or more portions each of which is subjected to a different controlled shear field.

35. The process according to claim 34, wherein two or more portions of said syrup which have been subjected to different controlled shear fields are recombined prior to further substantial polymerization.

36. The process according to claim 23, wherein said resin phase is a copolymer consisting essentially of:
   (1) from 50 to 90 weight % of styrene; and
   (2) from 10 to 50 weight % of one or more monomers selected from the group consisting of methyl methacrylate and ethyl acrylate,
said rubber is polybutadiene; and the final volume average diameter of the dispersed rubber-like composite phase is from 0.05 to 5 micrometers.

37. The process according to claim 36, further comprising polymerizing said syrup to crosslink the rubber and fix the particle size of the dispersed rubber-like composite phase.

38. The process according to claim 37, further comprising devolatilizing said polymerized syrup.

39. The process according to claim 38, wherein said at least a portion of said syrup is all of said syrup.

40. The process according to claim 38, wherein said syrup is divided into two or more portions each of which is subjected to a different controlled shear field.

41. The process according to claim 40, wherein two or more portions of said syrup which have been subjected to different controlled shear fields are recombined prior to further substantial polymerization.

* * * * *